March 25, 1969 — H. D. HUME — 3,434,733
RESILIENT TRAILER MOUNT
Filed Jan. 30, 1967 — Sheet 1 of 3
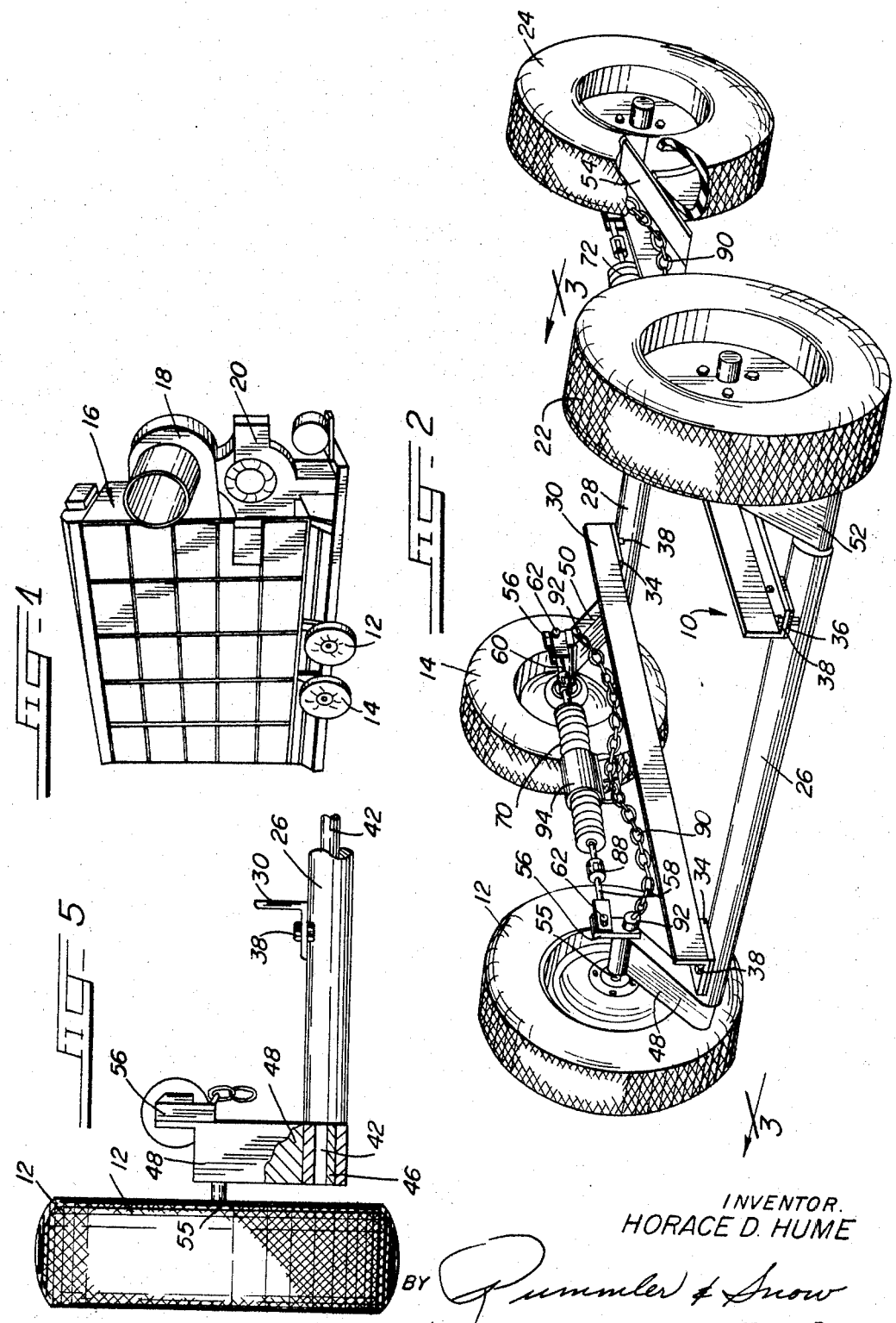
INVENTOR.
HORACE D. HUME
BY Pummler & Snow
ATT'YS

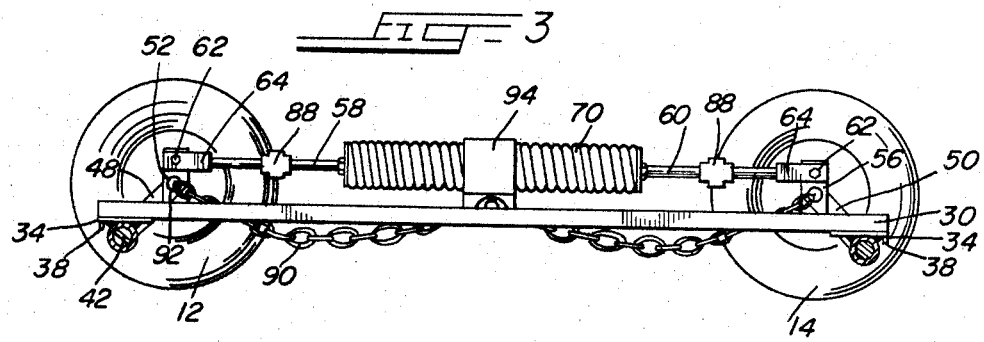
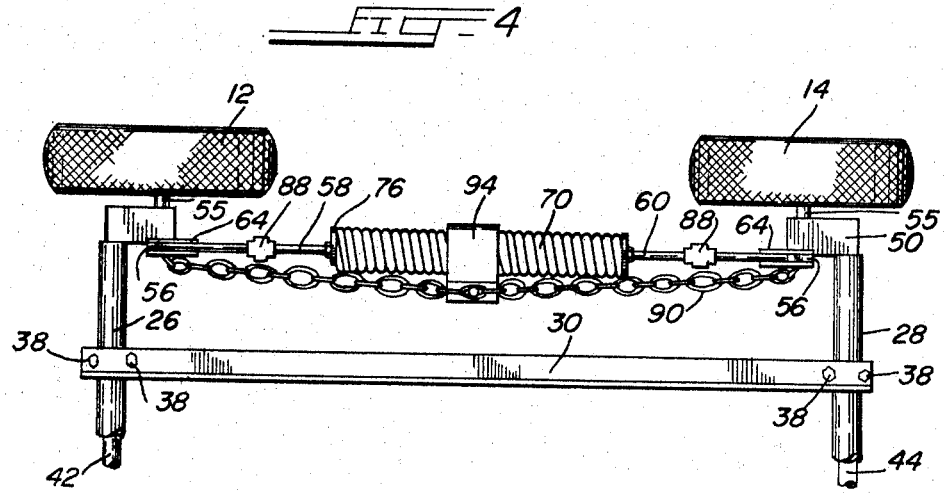
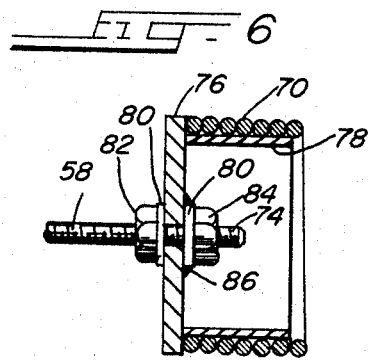

March 25, 1969 — H. D. HUME — 3,434,733
RESILIENT TRAILER MOUNT
Filed Jan. 30, 1967 — Sheet 3 of 3
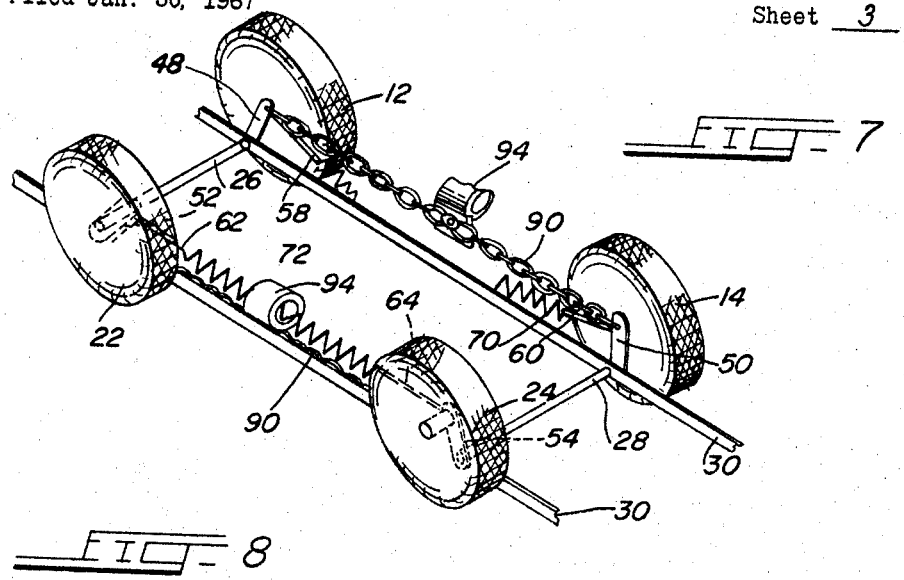
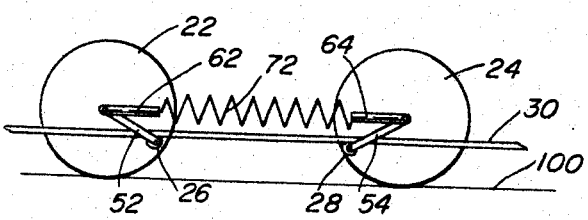
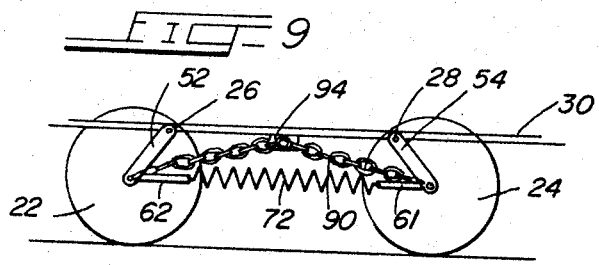
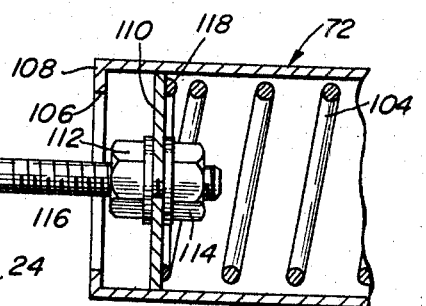
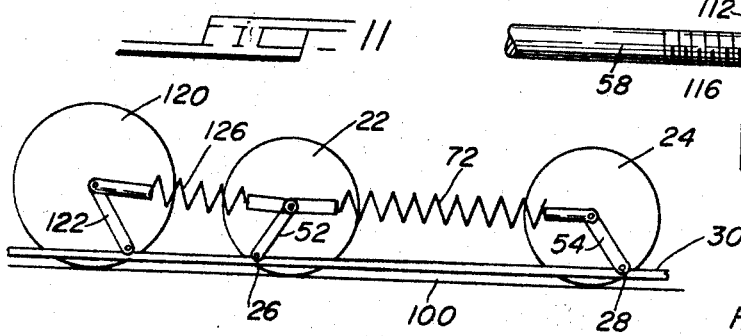
INVENTOR.
HORACE D. HUME United States Patent Office 3,434,733
Patented Mar. 25, 1969

3,434,733
RESILIENT TRAILER MOUNT
Horace D. Hume, Mendota, Ill., assignor to Hart-Carter Company, Chicago, Ill., a corporation of Delaware
Filed Jan. 30, 1967, Ser. No. 612,628
Int. Cl. B62d 61/10; B60d 5/04; B60g 25/00
U.S. Cl. 280—104.5                               8 Claims

ABSTRACT OF THE DISCLOSURE

A load carrying trailer-vehicle having pairs of wheels on the same side of the vehicle frame turning on respective longitudinally spaced spindles, each of which is mounted on a rigid arm, swingable in a vertical plane, about a respective fixed transverse axis, the said spindles being tied together by tension or compression springs to provide a resilient support for the frame and the corresponding arms on opposite sides of the frame being fixedly mounted on a common rotatably mounted axle.

Background of the invention

The invention pertains to the art of road vehicle suspensions and particularly to that field thereof which concerns frames having four or more wheels, each mounted on an indivdual spindle carried by a rigid arm which is swingable in the vertical plane about a fixed transverse axis and against the restraining force of a spring.

The known means for mounting wheels to a vehicle vary from the simple fixed transverse axle, with or without elliptical springs, to highly engineer the wheel suspensions employing coil springs, torsion bars, ball-point suspensions and split axles, as are found in automobiles or trucks and their trailers. Matters of balance, camber, caster, harmonic motion, dampening, ratio of sprung to un-sprung weight, and the like, become important considerations in these complex suspensions. Little or no attention has been paid to the problem of springing in vehicles required to carry bulky, heavy loads over all types of terrain, where low cost, stability and ruggedness become the prime factors of design. It has been found, however, that by mounting a wheel on a spindle at one end of a crank and loading the other end of the crank off-center of the supporting wheel while maintaining this off-center relationship, within all cycles of reciprocation of the suspension, by means of a spring having a capacity equal to or greater than the load applied to the spindle and wheel an unusually stable suspension is provided. Generally, prior art arrangements of this kind have been of complicated and costly structure and have not been suitable for simple trailer types of load carrying vehicles.

Summary

The inventive concept involved in this invention is to provide pairs of tandem wheels, on each of opposite sides of a vehicle frame, wherein each wheel is rotatably mounted on a spindle extending laterally from the end of a respective crank arm, the crank arms of opposite wheels being connected together at their pivot points by means of a rotationally floating axle extending across the vehicle frame, and the arms of the tandem wheels being tied together adjacent their spindle ends by resilient shock-absorbing means.

The suspension of this invention is particularly adapted for use with a two-by-two wheel system employing four load carrying wheels on two axles, or to a three axle system with six wheels (three on a side), wherein the axis of rotation of the wheels is not fixed in relation to the vehicle. Such tandem wheeled vehicles or trailers have been found to be most suitable for transportation of bulky equipment such as farm machinery, refining equipment, boilers, missiles and the like, and this invention provides a simple, rugged, easily maintained, fail-safe wheel suspension for trailers, flat beds and moving platforms of that kind.

Description of the drawings

Specific embodiments of this invention are shown in the accompanying drawings, wherein:

FIG. 1 is a perspective view showing a trailer vehicle according to this invention carrying a huge grain dryer;

FIG. 2 is a perspective view of a trailer showing one embodiment of this invention;

FIG. 3 is a side view of the same as seen from the plane of the lines 3—3 of FIG. 2;

FIG. 4 is a fragmentary plan view of the device as shown in FIG. 3;

FIG. 5 is a fragmentary and partially sectioned front-end view of the embodiment shown in FIG. 4;

FIG. 6 is a fragmentary sectional view showing one mode of spring attachment for use with this invention;

FIG. 7 is a diagrammatic view illustrating the operation of the safety chains shown with the device of FIGS. 2 and 5 inclusive;

FIG. 8 is a diagrammatic illustration of a tandem wheel suspension according to this invention wherein a compression type shock absorbing spring is used;

FIG. 9 is a diagrammatic view illustrating an embodiment of this invention wherein the load carrying frame is disposed above the wheel spindles.

FIG. 10 is a fragmentary cross-section view showing the mode of connecting a compression spring shock-absorber between tandem cranks in the manner set forth in FIG. 8; and FIG. 11 is another diagrammatic view illustrating the use of both a compression spring and a tension spring with three tandem cranks for a six-wheeled arrangement.

Description of the preferred embodiments

In FIG. 1 there is shown a trailer frame 10 with wheels 12 and 14 extending in tandem relation therefrom, supporting and carrying a grain dryer 16. The dryer illustrated is a typical load the instant trailer is adapted to carry safely and without damage. Farm machinery of this kind may be 10 to 15 feet high, 20 to 30 feet long, about 6 feet wide and weighing from 5,000 to 10,000 pounds. Auxiliary equipment such as the hot air blower 18 and the cold air blower 20 being located at one end thereof impart imbalance and make the machine cumbersome to transport. Inside these machines are conveyors, trays, vibrating screens, and other such material handling means which are primarily designed for operation while the machine is stationary or permanently installed on a suitable foundation. These parts are susceptible to damage and maladjustment during transportation to the user or relocation between multiple users, and the use of trailers with unsprung or very stiffly sprung wheels often results in damage to loads such as the grain dryer illustrated. The very size of machines of this nature makes the expense of fabrication to withstand occasional transportation prohibitive. By using the vehicle or trailer of this invention to transport such cumbersome, heavy machines, these problems are mitigated or eliminated.

Frame 10 can be formed of steel or wooden beams with or without a flat-bed thereon and with or without recesses, cleats, rollers, etc. for the purpose of loading, unloading, or securing the machine to be transported thereto. Frame 10 may be any desired shape such as rectangular or triangular, and the trailer may be fabricated as a separate unit for use in general hauling or may be made an integral part of the bulky machine. The trailer of this invention can be designed to carry boats, missiles, refinery equipment or for other special purposes.

Referring to FIG. 2, there is shown a preferred embodiment of this invention wherein the two-axle, four-wheeled tandem mount is provided comprising wheels 12 and 14 on one side and wheels 22 and 24 on the opposite side of a frame 10 having parallel transverse tubular members 26 and 28 and longitudinal members 30 and 32 forming a generally rectangular platform. Longitudinal members 30 and 32 are shown in the form of angle irons, although any other form or cross-sectional configuration for these members can be used. The frame structure and modes of securement of parts are subject to wide variation in design to suit the end puropse of the trailer. In the instant embodiment, pairs of plates 34 and 36 are welded or otherwise attached to tubular members 26 and 28 to act as supports and means of attachment for the ends of the longitudinal members 30 and 32. Two or more bolts 38 are used at each joint to form a rigid structure.

Transverse members 26 and 28 are tubular or cylindrical and carry floating shafts 42 and 44 respectively, in rotational relationship therein. Shafts or axles 42 and 44 extend beyond the ends of the tubular housings and are affixed at their ends by any suitable means, such as spline 46 (FIG. 5), to pivotal hangers 48, 50, 52 and 54. These shafts can have square ends which fit into square sockets in the ends of the hangers, or these shafts can be keyed to the hangers. Grease fittings, not shown, may be provided to aid in the lubrication of parts such as the transverse shafts 42 and 44.

At the extended ends of each pivotal hanger there is secured a spindle or fixed axle as illustrated at 54 in FIGS. 2, 4 and 5, each carrying a freely rotatable wheel on conventional bearings (not shown). The wheels 12, 14, 22 and 24 are shown to be equally spaced longitudinally and transversely of the vehicle frame. Any structure which provides a fixed pivot point for one end of the hangers can be used. Preferably, opposite hangers are rigidly affixed to a common transverse rotationally floating axle to give a torsion effect therebetween.

Although the wheels are shown to be of pneumatic type, this invention is not to be so limited, and ordinary farm equipment wheels which have cleats or solid rubber treads can be used. The tandem spacing between the wheels may be of any desired distance. For ease in turning, however, it is preferable that the tandem wheels be as close together as reasonably possible to provide clearance between them as they oscillate over bumps or obstructions.

As shown in FIGS. 3 and 4, the swinging end of each hanger has an integral lug 56 to which is secured spring actuator rods 58 and 60 by means of pins 62 engaging bifurcated ends or yokes 64 secured to the adjacent ends of the said rods. The rods may be threaded into openings in the yokes or may be welded thereto. The inner ends of rods 58 and 60 are fixedly attached to the respective end of a coiled tension spring 70. One mode of attachment is illustrated in FIG. 6 wherein the rod 58 has its threaded end 74 extending through a suitable aperture in a flanged end plate 76 integral with a collar 78 and held thereto by means of opposing washers 80 and nuts 82 and 84. The washer 80 and the nut 84 on the inside of the end plate 76 may be secured thereto as by a weld 86 to facilitate connection of the respective rods. As shown the spring 70 abuts against the flange of the end plate 76 and is welded or otherwise affixed thereto. Any means of attachment which holds the rods securely to the springs may be used, the arrangement shown in FIG. 6 being merely one form of connection believed to have sufficient strength for most loads and also providing means for axial adjustment of the assembly.

Each rod 58 and 60 can be a single unit from the yoke to the spring or can be provided with a turnbuckle as at 88 to facilitate axial adjustment.

A safety chain or cable 90 is preferably provided for preventing total collapse of the arms 48 and 50 in the event the spring 70 should break. The chain or cable 90 is attached between the lugs 56 by means of studs 92. Also one or more straps or slings made of a suitable rupturable material such as rubber or leather may be used as a sling to hold the loop of the chain or cable 90 from dragging on the ground, the chain or cable being long enough to allow full spring action, yet of a length to catch the arms 48 and 50 to prevent their turning to vertical or full collapsed position, as shown at the upper portion of FIG. 7.

In FIG. 7 the arrangement of parts for a two-axle tandem wheeled vehicle is shown diagrammatically. Wheels 22 and 24, at the lower portion of the figure are mounted on spindles extending laterally from hanger arms 52 and 54 in tandem relationship toward each other from the respective axle housings 26 and 28. The ground or road surface is indicated at 100 and the pivot point of each hanger arm, that is, the axles 42 and 44, is above the ground level, wheels 22 and 24 being pulled toward each other by the spring 72. In this portion of the figure the hanger strap 94 is shown supporting the safety chain or cable 90 from the spring 72. It is to be observed that as the wheels 22 and 24 oscillate the spring 72 acts against their upward movement toward the vertical position and the movement of one wheel is counteracted by the resilient connection with the other wheel. The weight of a load on the frame 30 tends to pivot the wheels upwardly and away from each other toward the vertical position under which condition the frame 30 would drop almost to the ground level. It is this tendency that is resisted by the spring 72 and wherefrom the resilient cushioning of the load carried by the frame 30 is had.

At the upper portion of FIG. 7, the spring 70 normally extending between the wheels 12 and 14 is shown to have broken. Upon this occurrence the strap 94 has been released or become broken and the chain or cable 70 now holds the hanger arms 48 and 50 at a sufficient angle toward each other to maintain ground clearance and mobility of the vehicle frame 30. In this way the assembly is a fail-safe arrangement.

In the diagrammatic view of FIG. 8, the transverse axles 42 and 44 are positioned closer together than the normal position of the hanger arms 52 and 54, and in this arrangement the resilient spring member 72 will be a compression member since the load on the frame 30 will tend to bring the wheels 22 and 24 toward each other. The operation of this arrangement of the wheel suspension is normally like that of the arrangement shown in FIG. 7, the principal difference being merely that the resilient member 72 is an element acting in compression rather than in tension.

A suggested arrangement for the compression member 72 is shown in FIG. 10 wherein a tubular housing 102 encompasses helically coiled compression spring 104 with the rod 58 connected thereto through end opening 106 by means of pressure plate 110 and nuts 112 and 114 engaging threads 116. The rod 58 may be welded to the plate 110 if desired, the plate being free to move within the housing 102 against the spring 104. If desired the end convolution 118 of spring 104 may be welded to the plate 110. The housing 102 maintains a straight line relationship of the spring 104 and a lubricant may be provided within the housing 102 to minimize friction therein.

FIG. 9 illustrates diagrammatically an arrangement which is the reverse of the embodiment shown in FIG. 8, that is, the frame 30 is supported above the wheel spindles with the hanger arms 52 and 54 extending downwardly and outwardly from the respective axles 42 and 44. In this arrangement the resilient member 72 is under tension caused by the weight of the load on the vehicle frame 30 tending to force the wheels 22 and 24 away from each other and upwardly relative to the frame 30. In this arrangement the safety chain or cable 90 is essential to the assembly in order to keep the hanger arms 52 and 54 from flattening to a horizontal position, and as shown, a hanger strap 94 attached to the frame 30 is employed to hold the safety chain or cable 90 from dragging or engaging the ground.

FIG. 11 is a diagrammatic illustration of two additional aspects of this invention, namely, the use of a 3-axle suspension with three wheels on each side of the vehicle frame and the use of wheels of different size. As shown in FIG. 11, wheels 22 and 24 are mounted on hanger arms which extend upwardly and toward each other, relative to the frame 30 and with respect to the axles 42 and 44, as in the arrangement of FIGS. 2 to 5 and 7, while wheel 120, which may be trailing or leading, is mounted on a hanger arm 122 extending upwardly from a third axle 124 and normally acting toward the hanger arm 52 through a compression member 126. The wheel 120 is shown to be larger than the wheels 22 and 24 and the hanger arm 122 is slightly longer than the others to accommodate the larger diameter wheel 120.

An advantage of the wheel suspension of this invention is that the spring arrangements can be made to accommodate wheels or tires of different sizes without changing the load distribution, simple adjustment of the rod lengths, as by means of the turnbuckles, being all that is necessary to make each wheel bear its proportionate share of the load or bump-absorbing action.

From the foregoing description, it will be apparent that this invention relates to a wheel suspension assembly for use with a load-supporting frame comprising a pair of spaced axle housings mounted transversely of the frame and each carrying a floating rotatable axle having hanger arms rigidly attached at each end which arms carry spindles at their free ends for mounting the vehicle wheels. Where the load is suspended under the axis of rotation of the wheels (FIG. 7), the hangers can converge upwardly and be retained by means of a resilient (tension) member therebetween, or they can diverge upwardly (FIG. 8) and be retained by a compression member therebetween. Where the load is above the axis of rotation of the wheels (FIG. 9), hanger arms can diverge downwardly from the frame and be retained by a resilient (tension) member therebetween, or combinations thereof can be used (FIG. 11). It will be understood that the embodiments shown in FIGS. 7, 8, 9, and 11, are illustrative of mechanical changes that may be fabricated from the parts shown in FIGS. 2–6 inclusive and 10 to form an operable vehicle having wheels on both sides of the frame.

By changing the relationship of the ground 100 to the opposite side of the wheels, that is, turning the assembly shown in each of FIGS. 7, 8, 9, and 11 upside down, it will be apparent that the suspension shown in FIG. 7 becomes an additional embodiment of this invention with the tension members 70 and 72 replaced by compression members. In FIG. 8 this transposition becomes a duplicate of FIG. 9 with compression member 72 of FIG. 8 becoming a tension member. This upside-down position of the embodiment shown in FIG. 11 is made operable by changing tension member 72 to a compression member and compression member 126 to a tension member.

Accordingly, a given vehicle having therein the suspension of this system can be used in either position by interchanging the resilient members. These parts can be so dimensioned and fabricated as to be easily interchanged and a given trailer can be used in either position to accommodate different loads and ground clearance conditions. A reversible or universal trailer hitch would be used to facilitate attachment to a drawbar.

Instead of using floating axles wherein a single rod 42 or 44 passes from one end to the other of the respective axle housing in rotational relationship therewith to provide a torsion action between the wheels depending on differences in effective torque or load imparted to opposite wheels on the same axle, each axle 42 or 44 can be affixed at its approximate center within the respective housings 26 and 28 to provide full torsion springing equivalent to a whole or part of the load. Resilient members 70, 72, etc. then act as snubbers and can be designed to dampen the torsion action of the axle shafts.

Although several embodiment of the invention have been herein shown and described, it will be understood that details of the constructions shown may be altered or omitted without departing from the spirit of this invention as defined by the following claims.

I claim:

1. A wheel suspension for a load-carrying vehicle comprising in combination:
    (a) a longitudinal frame having a pair of longitudinally spaced rotatable axles mounted transversely thereon and extending beyond each side thereof,
    (b) an angularly swingable hanger arm fixed to and extending in a vertical plane from each end of each of said axles,
    (c) load supporting wheels rotatably journaled on the extended ends of said hanger arms, and
    (d) a resiliently yieldable member attached between the extended ends of the hanger arms on each side of said frame for holding said arms inclined with respect to the plane of said frame.

2. A wheel suspension in accordance with claim 1 wherein said axles are spaced outside of the axes of rotation of said wheels in the longitudinal direction of said frame, said hanger arms converge upwardly toward each other, and each of said resilient members is a tension member.

3. A wheel suspension in accordance with claim 1 in which said axles are spaced inside the axes of rotation of said wheels, said hanger arms diverge upwardly from said axles, and said resilient member is a compression member.

4. A wheel suspension in accordance with claim 1 in which said axles are spaced inside the axes of rotation of said wheels, said hanger arms diverge downwardly from said axles, and said resilient member is a tension member.

5. A wheel suspension in accordance with claim 1 wherein said frame comprises a pair of laterally spaced longitudinal members, a pair of longitudinally spaced transverse axle housings are mounted on said longitudinal frame members, said transverse axles are rotatably mounted within said housings, the arms on each side of said frame converging upwardy from said axles, and said resilient member is an axially yieldable tension means for holding said hanger arms in a generally converging position against the weight of a load on said frame members urging the arms toward a position normal to the frame.

6. A wheel suspension in accordance with claim 1 in which the resilient member is an axially yieldable tension member and a normally slack restraining means is attached between said hanger arms for limiting the maximum swinging movement thereof upon failure of said tension member.

7. A wheel suspension in accordance with claim 6 in which said hanger arms converge upwardly from said axles and said restraining means is shorter than the longitudinal distance between said axles by an amount sufficient to prevent said hanger arms from rotating beyond the normal motion allowed by said resilient member.

8. A wheel suspension in accordance with claim 2 wherein a third transverse axle is mounted on said frame, a third hanger arm is affixed to each end of the third axle and diverges upwardly away from the next adjacent hanger arm, a wheel is rotatably journaled on the extended end of each third hanger arm, and a compression member is attached between each third hanger arm and said next adjacent hanger arm.

References Cited

UNITED STATES PATENTS

| | | | |
|---|---|---|---|
| 3,363,913 | 1/1968 | McFarland | 280—104.5 |
| 3,011,795 | 12/1961 | Cox | 280—104.5 |
| 2,869,889 | 1/1959 | Dickison | 267—20 X |
| 1,894,776 | 1/1933 | Liang | 267—20 X |

FOREIGN PATENTS 654,482  12/1937  Germany.

PHILIP GOODMAN, *Primary Examiner.*

U.S. Cl. X.R.

267—20